Dec. 15, 1936.   C. W. A. KOELKEBECK   2,064,014
HOSE COUPLING
Filed Aug. 16, 1934
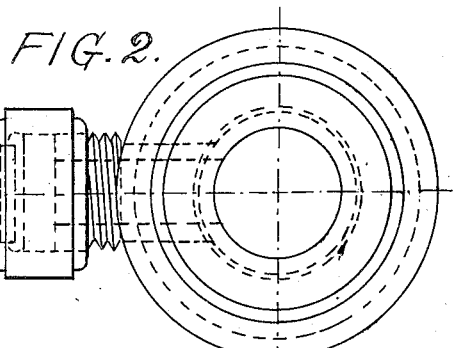
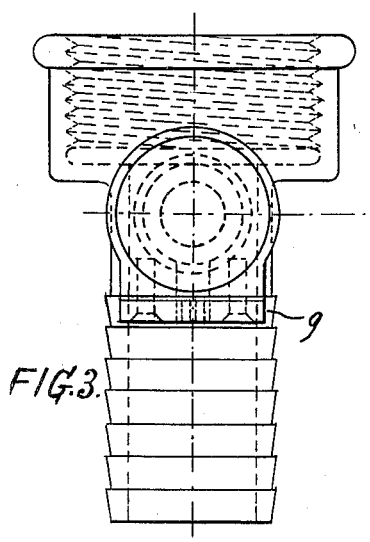
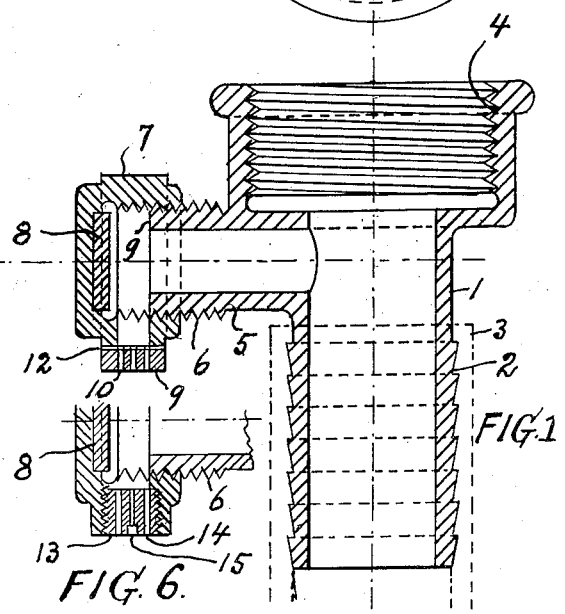
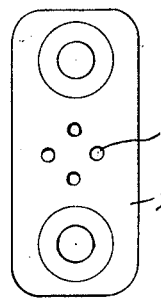
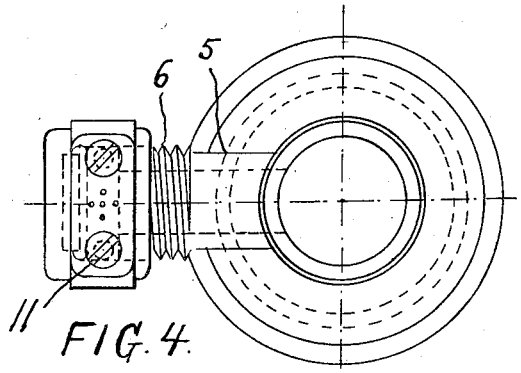
INVENTOR:
Carl W. A. Koelkebeck
by William B. Jaspert
Attorney.

Patented Dec. 15, 1936

2,064,014

UNITED STATES PATENT OFFICE 2,064,014

HOSE COUPLING

Carl W. A. Koelkebeck, Pittsburgh, Pa.

Application August 16, 1934, Serial No. 740,092

2 Claims. (Cl. 138—44)

This invention relates to new and useful improvements in hose coupling, and it is among the objects thereof to provide a lateral flow outlet for hose couplings which shall be adapted to produce a stream of water for the purpose of obtaining a water supply without disconnecting the coupling member.

The invention will be more clearly illustrated and described in connection with the accompanying drawing constituting a part hereof in which like reference characters designate like parts and in which:

Fig. 1 is a longitudinal section of a hose coupling embodying the principles of this invention;

Fig. 2 a plan view thereof;

Fig. 3 a side elevational view thereof;

Fig. 4 a bottom view;

Fig. 5 a bottom view of a muffle portion of the nozzle; and

Fig. 6 a modified form of the muffler.

The figures of the drawing are substantially double size to more clearly illustrate the structure.

Numeral 1 designates a hose coupling having the conventional serrated portion 2 for engagement with a flexible hose end 3, the coupling having a threaded portion 4 for attachment with an outlet valve of a water supply system. Coupling 1 is provided with a lateral extension 5 having a threaded portion 6 for receiving a fitting 7 which may be termed a bonnet and is provided with an internal thread for interaction with the thread 6 of the lateral extension 5. The bonnet is provided with a packing or seat 8 adapted to abut the end 9 of the lateral extension 5 to seal off the flow passage of the extension. The bonnet 8 is provided with an orifice plate 9 having small openings 10 to provide a restricted flow of water. The plate 9 may be of rectangular form as shown in Figs. 4 and 5, and is attached to the bonnet 7 by screws 11. A packing 12 is disposed between the muffle and the bonnet to secure a water tight joint. In the modification shown in Figure 6, the muffle consists of a perforated screw plug 13 having openings 14 and slot 15 for purposes of inserting a screw-driver to screw the muffle into its threaded seat.

In the operation of the device, the hose-coupling is connected in the usual manner to the flexible hose, this connection being a conventional form and is further attached on the screw thread of a water supply outlet by its threaded portion 4. In ordinary use, the bonnet 7 is screwed on thread 6 to abut the packing 8 against the end face 9 of the lateral extension 5, thus preventing any flow through the lateral passage. When desired, bonnet 7 may be unscrewed to cause the admission of fine streams of water from the openings 10 of the plate 9 which may be useful to fill a container when the hose system is otherwise in use for sprinkling purposes, or the small jets of water may be utilized to cleanse the operator's hands after the sprinkler has been moved or set up or if the hose has been wound on its reel, without breaking the connection of the hose coupling with the source of supply.

A device of the kind herein described provides instant use of water for washing purposes without interrupting the normal use of the hose or without necessitating the unreeling of the hose from its support. The structure is of simple form and may be economically produced thus facilitating a wide use of the device.

Although one embodiment of the invention is herein illustrated and described, it will be obvious to those skilled in the art that various modifications may be made in the details of construction without departing from the principles herein set forth.

I claim:

1. A hose coupling comprising a sleeve for receiving the end of a hose having a screw thread portion for engagement with a threaded outlet of a water supply line, said sleeve having a lateral extension provided with a thread for receiving a bonnet, said bonnet having a perforated orifice plate at right angles to said lateral extension for restricting the flow through the lateral extension.

2. A hose coupling having a hose receiving end and a threaded portion for engagement with a source of water supply and having a lateral extension for the flow of fluid, said extension being provided with a threaded bonnet having a packing for sealing the lateral extension, and said bonnet having an orifice plate for limiting the flow through said extension, said orifice plate having perforations for restricted flow of water at right angles to the flow through the lateral extension.

CARL W. A. KOELKEBECK.